FIG. I.

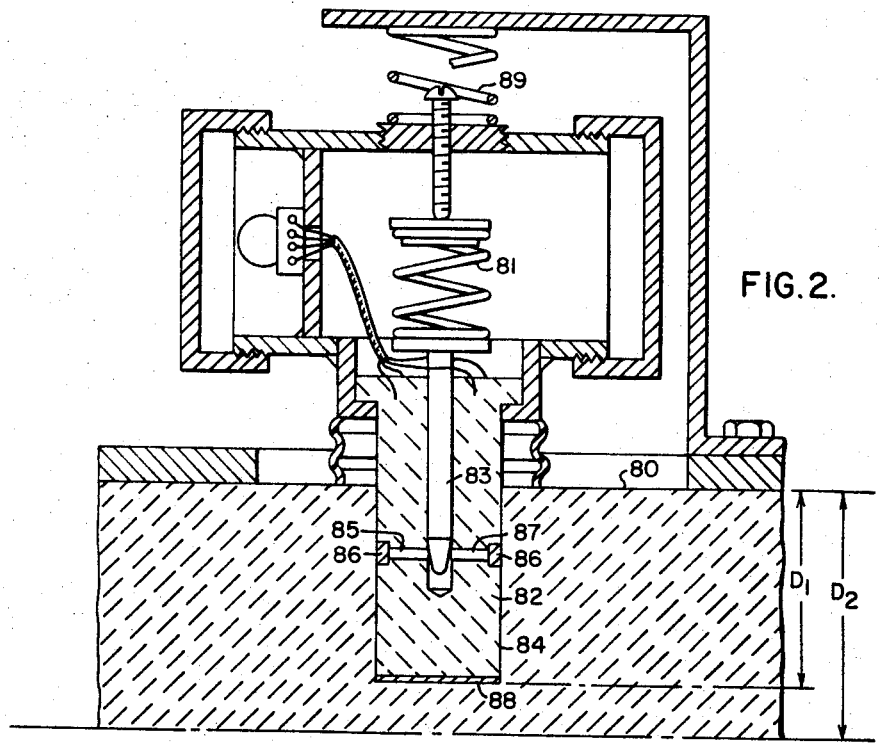
FIG. 2.
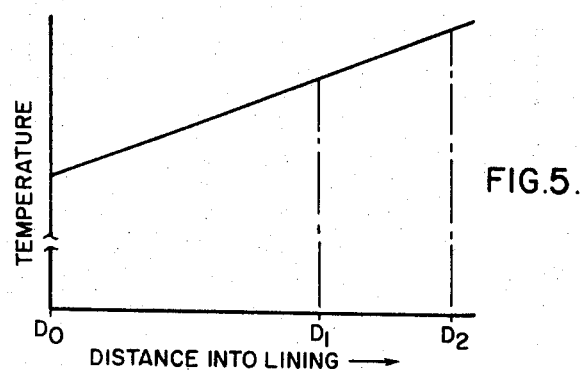
FIG. 5.
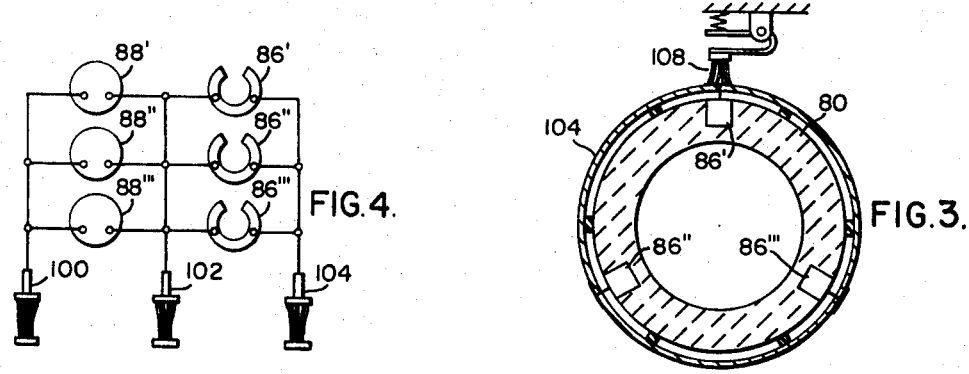
FIG. 4.
FIG. 3.

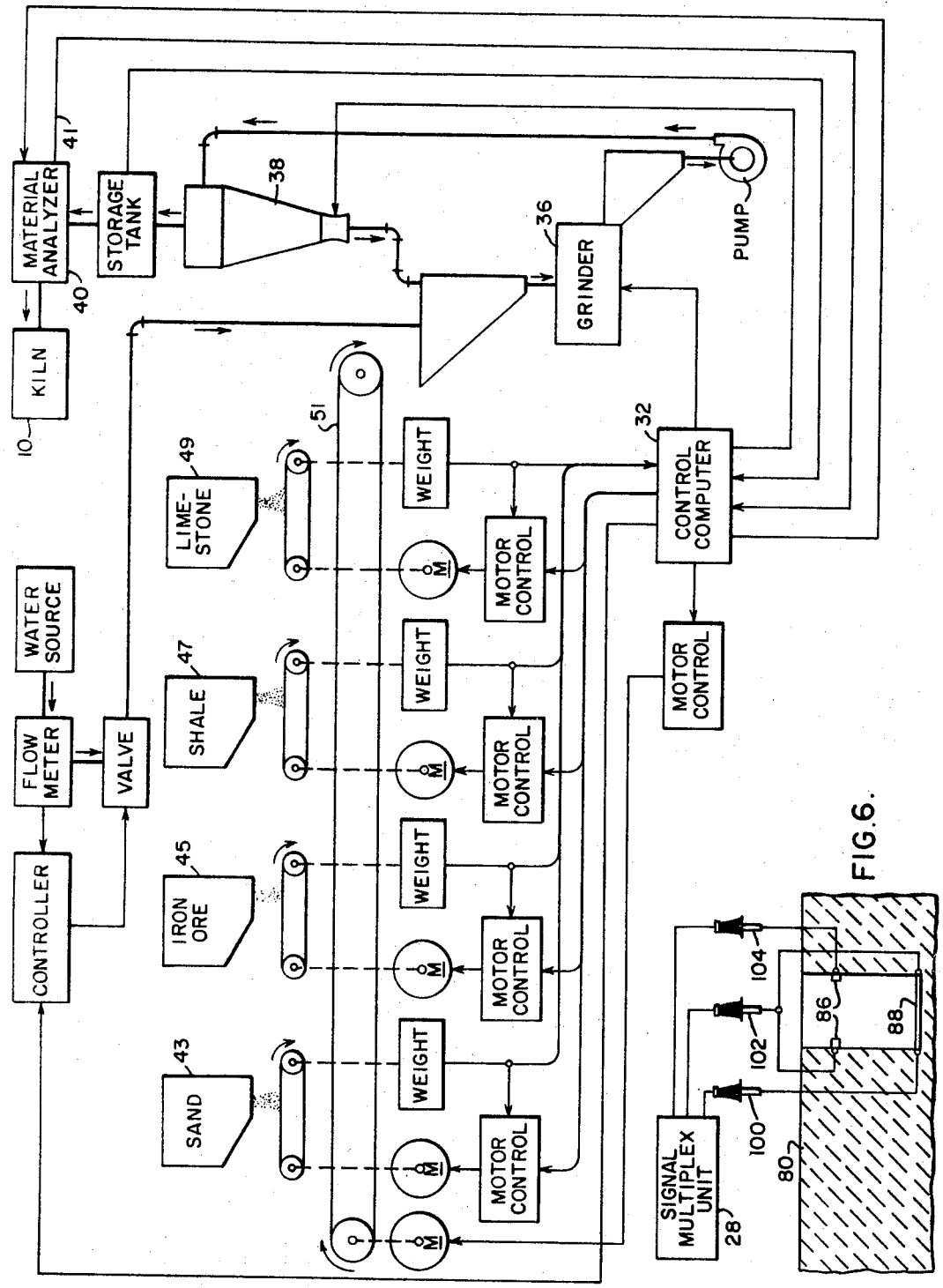

United States Patent Office 3,437,325
Patented Apr. 8, 1969

3,437,325
HEAT BALANCE CONTROL OF A ROTARY KILN
Richard E. Putnam, Penn Hills, and Lee E. Brecher and Dave H. Archer, Pittsburgh, and Ray L. Zahradnik, Murrysville, Pa., assignors to Westinghouse Electric Corporation, Pittsburgh, Pa., a corporation of Pennsylvania
Filed Apr. 11, 1967, Ser. No. 630,001
Int. Cl. F27b 7/00; G05d 23/00
U.S. Cl. 263—32                                8 Claims

ABSTRACT OF THE DISCLOSURE

Control of the heat balance relationship of a rotary kiln is effected by measuring the heat flow through the walls of the kiln, and the heat losses in the exhaust gases and clinker, determining the heat energy input to the kiln, and from these obtaining through predetermined calculation the actual heat given up by the reaction taking place within the kiln. By measuring the materials supplied to the kiln, the theoretical and potential exothermic heat of reaction can be determined and utilized as a reference for controlling the operation of the kiln. Any difference between the actual heat of reaction and this reference theoretical heat of reaction is determined and employed as an error signal in a closed loop control arrangement for controlling the kiln operation.

Cross reference to related applications

A related copending patent application has been filed by R. E. Putman to cover the control apparatus for a material grinder device; it is identified as Ser. No. 601,- 618 filed Dec. 14, 1966 now U.S. Patent No. 3,379,421 and is assigned to the same assignee as is the present application.

A second copending patent application has been filed by R. E. Putman to cover the particle size classifier control utilized in the application of the present invention; it is identified as Ser. No. 601,608, filed Dec. 14, 1966 and is assigned to the same assignee as is the present application.

Background of the invention

The present invention relates to the control of a rotary kiln suitable for application in the cement or taconite industries, and more particularly relates to a heat balance control of a rotary kiln including the control of the heat energy applied to the materials within the kiln to maximize the desired heat of reaction effected within the kiln.

The prior art control of a rotary kiln has included the rough approximation of the heat of reaction taking place within the kiln and such approximation has been too unreliable and inadequate for the practical and immediate control of the kiln and the actual heat of reaction taking place within the kiln.

Summary

The present invention includes the measurement of the heat flow through the walls of the kiln and this is added to the heat escaping in the exhaust gases and leaving with the clinker to give a combined quantity from which is substracted the heat energy input to the kiln due to the combustion of supplied fuel coupled with the heat recovered in the air to yield a determination of the actual heat of reaction generated within the kiln.

By measuring the quantities of the material supplied to the kiln, the predeterminable theoretical heat of reaction that should be generated is known from the chemical reaction which should be occurring and past experience with the operation of such a kiln; and a determination of the difference between what heat of reaction in theory should be taking place within the kiln and the lesser actual heat of reaction that is taking place gives a difference which is converted into an error signal and is applied to the clinker temperature controller or to the kiln speed regulator control for varying the speed of the kiln as required to minimize this heat balance difference or kiln operation error signal.

It is an object of the present invention to provide an improved control for a rotary kiln, which control better accomplishes the desired heat balance relationship within the kiln through better realizing optimum and desired heat of reaction relationships in terms of the material treatment operation both external and within the kiln.

FIGURE 1 provides a diagrammatic showing of the general control arrangement of the present invention;

FIG. 2 is a detailed showing of one suitable embodiment of the heat flow measurement device utilized in the practice of the present invention;

In FIG. 3 there is shown the peripheral arrangement of the heat flow measurement sensing devices and the signal sensing technique employed;

FIG. 4 illustrates the parallel connection of the heat flow sensing device for a given location;

FIG. 5 is a curve to show the temperature distribution within the kiln wall;

FIG. 6 shows the electrical connections between the heat flow sensing devices and the collector ring for a given location; and FIG. 7 is a schematic showing of the new material source and material grinder and particle size classifier operations.

Figure 1:
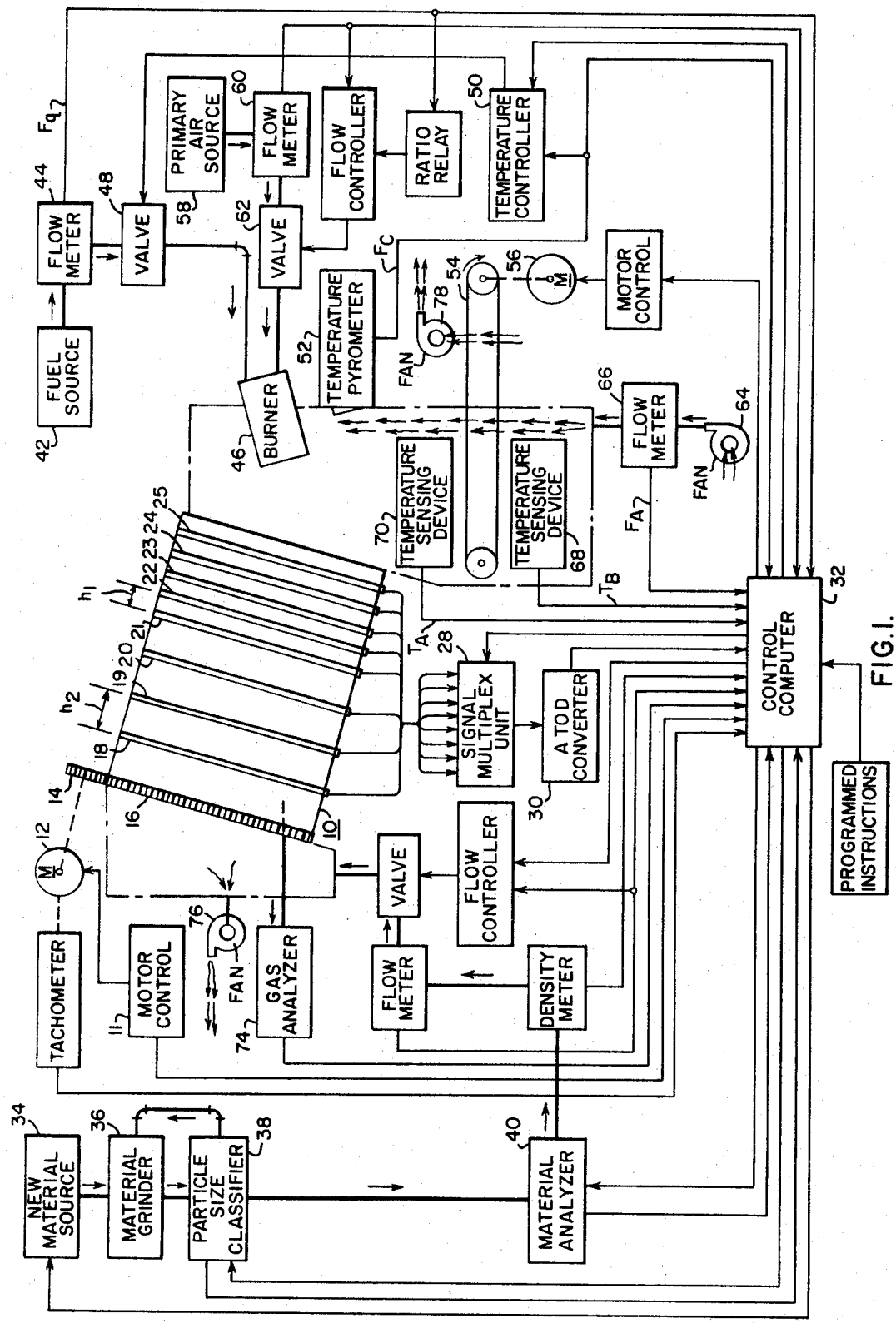

The manufacture of cement using a rotary kiln is difficult on several grounds. Frequently, the raw materials fed to the kiln are not consistent in their blend or particle size distribution; in the kiln itself there are four discrete zones consisting of drying, calcining, burning and cooling, with changes in any one of these having a significant effect on the others; furthermore, the actual values of the temperatures and distribution throughout the process also have an important effect on the nature and degree of the reactions taking place in the corresponding zones.

To be able to improve the control of a kiln itself, it is important that greater consistency be obtained in the composition and quality of the raw material fed to the kiln. To control the chemical analysis of the final blend, it is necessary first to know the chemical analysis of each raw material contributing to the blend in order to be able to calculate the relative flow rates of each necessary to meet the final blend analysis. Several methods of computing these raw material relative feed rates are available depending upon the nature and number of the raw materials being used. Where four raw materials are available, each of which contributes the major portion of one particular oxide, it is customary to use the solution of a four by four matrix to determine the relative flow rates, as will be later described.

The oxides normally held constant in the final blend consist of lime, silica, alumina and iron oxide. Magnesia and sulfates are often specified as constraints, but the basic calculation concerns the four principal oxides already mentioned. A typical set of analyses for the basic raw materials of limestone, sand, shell and iron ore on an unignited basis are subsequently given in the provided table. The balance of these percentages consist of, for instance, carbon dioxide or combustibles, or of residual solids other than the four basic oxides. The set of four simultaneous equations which may be constructed from the above data are given where lime, sand, alumina and iron oxide are represented respectively by C, S, A and F, while the limestone, sand, shell and iron ore are represented respectively by W, X, Y and Z. The suffix T denotes the portions of the oxides desired in the final blend. Knowing now the relative flow rates of the different raw materials, the computer can control these automatically as desired.

The raw material after passing through a grinding mill is then classified, with the overflow passing forward to a storage tank while the underflow is returned to the inlet of the mill. When the storage tank has become partly full of slurry, a chemical analysis is made of a slurry sample. Mass balance techniques can be used to calculate the new proportions of the oxides which should be present at the mill inlet and these are used to adjust the raw material relative flow rates to restore the analysis of the slurry in the tank to that desired in the final specification.

The total flow of new material to the mill may be controlled at a steady value, from a common master signal, with the relative flow rates of the different raw materials being determined by the settings of their respective ratio relays.

Alternatively, by carrying out a materials balance around the mill, the new raw material total flow rate may be adjusted to hold the sum of this and the underflow material returned from the classifier at maximum mill capacity. Not only does holding mill load constant help to give a more consistent particle size distribution in the slurry leaving the mill, but this can further be improved by regulating the flow rate of water added at the mill inlet to hold the pulp mixture density at a constant value of about 60% solids by weight. Water proportioning may be achieved by summing the various raw material flow rates and adding water in the desired ratio.

It is desired that the consistency of the slurry fed to the storage tank be held substantially constant since this effects the behavior of the slurry in kiln; water could be added at the cyclone overflow for this purpose if desired. To improve the operation of the cyclone it is desirable that it be fed with a substantially constant volume of slurry at substantially constant density. To control density, water may be added at the mill discharge sump or pump inlet if desired, and controlled from a density transmitter installed in the discharge line from the pump. Since some of this water would be recycled through the mill with the cyclone underflow, the amount of water so recycled should be taken into account when proportioning the feed of new water in relation to total solids feed rate.

The measurement and control of particle size distribution of the slurry leaving the cyclone overflow has formed the subject matter of copending patent application Ser. No. 601,608, filed Dec. 14, 1966, by R. E. Putman.

The above methods for regulating the chemical analysis of the blend, correcting raw material feed flow rates to restore the blend in stored slurry, control of pulp densities at mill inlet and outlet and at the cyclone overflow, and control of particle size distribution of the slurry passing forward to storage, together provide a feed stock to the kiln which is consistent in both chemical analysis and particle size distribution.

Constant chemical analysis not only helps to ensure constant quality of clinker leaving the kiln but also to prolong kiln lining life, since the equilibrium of lining and feed-stock is disturbed with changes in chemical analysis. Control of slurry consistency or water content assists drying of the slurry, prevents ring build-up and helps to improve the thermal consistency of the process. It also aids precipitator operation at the discharge end of the rotary kiln and helps to control corrosion of any metal parts in the flue system. Control of particle size distribution ensures intimate mixing of the oxides and increases the probability of their being in contact when present together in the burning zone where the oxide combination takes place.

In the kiln the material flows towards the burner end, while the air and gases pass through the kiln from the burner towards the feed end of the kiln. Even if feed flow and gas flow rates are held constant, the temperature distribution and heat exchange between gases and raw material can vary and disturb the effectiveness of the cement process. The two primary kiln operation control parameters available are temperature of the clinker in the burning zone and the speed of the kiln which controls material retention time and material profile within the kiln. Burning zone temperature is regulated by varying the fuel combustion rate. However, since maximum combustion efficiency coincides with a stipulated maximum oxygen in the flow gases, the ratio of total air or gas to the fuel fired is to this extent fixed. Thus gas volumes and temperature vary with firing rate and change the heat transfer characteristics along the whole length of the kiln.

In accordance with prior art practice, a control system for a cement kiln consists of apparatus for regulating the fuel firing rate from clinker temperature, apparatus for controlling the secondary air flow at a fixed rate and manual adjustment of kiln speed as the observed position of the burning zone varies.

The preferred control parameter available to indicate the degree of completion of the sintering process is to measure the exothermic heat of reaction which is involved. Since the theoretical exothermic heat of reaction is known from the analysis of the raw material fed to the kiln, and this is already being controlled constant through the described operation of the control computer by the methods described above, a comparison of the actual and theoretical exothermic heats of reaction gives an indication as to how effective the sintering process is being conducted.

The method of calculating the actual exothermic heat of reaction is indicated in the following explanation. Assuming that particle size distribution has been satisfactorily controlled by the method already described, a deficiency of exothermic heat will be used to adjust the set point of the sintering temperature controller, raising the burning zone temperature by an amount to bring the actual exothermic heat of reaction within a prescribed percentage in the order of 5% of the theoretical value. Furthermore, from a knowledge of temperature distribution along the length of the kiln and particularly in the burning zone, the computer can adjust automatically the speed of the kiln to hold the burning zone within the prescribed position of the kiln. Other control variables which may be used are the ratio of primary to secondary air, keeping the total air flow constant. Alternatively, the temperature of the primary air may be adjusted, to change the flame shape and the heat transfer characteristic of the flame to the clinker. A constraint on primary to secondary air distribution is the degree of cooling of the clinker on the cooler itself. An additional parameter may be to take into account, the amount the air leaking in between the burner hood and the kiln and adjusting the total air flow to hold the oxygen content of the gases leaving at the feed end of the kiln to within the required excess air percentage. Other parameters may be to vary the thickness of the clinker on the cooler, so changing the permeability of the clinker bed to air flow and modifying the heat transfer characteristic between clinker and secondary air. However, all of these possible control loops depend upon a knowledge of the conditions within the kiln for which exothermic heat of reaction is the most direct parameter.

The rotary kiln to be controlled in accordance with the teachings of the present invention has a rotational speed in the order of one revolution in 90 seconds, a length between 150 feet long up to 700 feet long and a diameter from 10 feet to 24 feet. In its normal operation its external surface is exposed to the outside atmosphere. If the rotary kiln is caused to rotate faster, this increases the flow of materials through the kiln, and causes the burning zone to move closer to the burner. The temperatures within the kiln can be adjusted by increasing the supply of fuel to the burner.

The present invention will be described in relation to the application of a digital computer including a predetermined control program operative with its storage memory for controlling on a step-by-step basis a wet process cement plant. A typical wet process cement plant at the present time includes the following series of operations: (a) raw materials handling storage and stock piling, (b) raw materials blending, (c) raw materials grinding, (d) the rotary kiln, (e) clinker blending to meet the finished cement specification, and (f) finished cement bulk storage. In accordance with the present invention regulation on line of the raw materials blending and raw materials grinding prior to the supply of the resulting materials to the kiln is provided to improve the provided control operation of the rotary kiln, since fluctuations in the quality of the materials feed to the kiln can have a significant effect upon the kiln control parameters. For this purpose the present computer is applied to control the raw material feeders in accordance with a predetermined calculation involving the relative flow rate of each raw material required to achieve a desired raw feed blend; optimization of the grinding mill is accomplished through control of the particle size of the output material leaving the grinding mill; and the heat balance control of the rotary kiln is accomplished.

It is now common practice in the operation of cement plants to install X-ray material analyzers which measure in sequence the X-ay counts of four or five involved oxides in separate samples of the various raw material feeds. These counts can be fed directly into the computer, with the computer sequencing the operation of the X-ray material analyzer and the resulting X-ray count being supplied in sequence to the computer to indicate the component material analysis. The supply of new material to the process can include the control of material weigh-feeders, one being provided for each raw material fed to the process as set by a master signal through ratio relays; this control arrangement enables the total flow rate to be set and additionally the relative flow rate of each individual material to be set. Some water is added at the inlet of the grinding mill in a predetermined ratio to the total feed rate of solid raw materials. The slurry leaving the grinding mill is pumped to a cyclone particle size classifier with the fines therefrom going forward to a slurry mixing and holding tank while the oversized particles are returned through the apex valve of the particle size classifier to the input of the grinding mill. Regulation of the density of the slurry in the holding tanks can be included.

The materials analyzer is caused to analyze the four different raw materials and the mixed slurry in the storage tank at selected time intervals. The oxides normally measured are those of lime, silicon, iron, aluminum, magnesium and titanium. If desired, a chemist signal input panel can be provided to supply manually the resulting X-ray counts as inputs to the computer or the computer can sequence the input supply of this information. A preset program within the computer allows the counts to be converted automatically into percent of each oxide by weight in the corresponding raw material or slurry. From the specification of the desired blend which has already been inserted into the computer storage, the computer can now calculate the relative flow rates of each raw material to achieve a desired oxide blend.

If it is determined that the actual blend in the storage tank is not precisely that desired in accordance with the information initially stored in the computer, due to minute by minute variations in the quantities of the various raw materials supplied, the computer can now perform a calculation which takes into account the difference in the analysis and the volume of the slurry storage tank which remains to be filled and then determines the new input slurry blend required in order to restore the total contents of the storage tank to the blend originally desired. This new required blend may now be substituted in the mathematical model selected earlier for the computer and the new individual raw material feed rates calculated with the ratio relays being adjusted accordingly.

As a matter of practical interest in the standard wet chemistry method of cement materials analysis, titanium and aluminum behave in a similar way and report together. Since their X-ray wavelengths are different, however, they can be measured separately on the X-ray machine. The computer would thus be programmed to derive the combined alumina percentage taking the titanium content into account.

The digital computer can be tied into the ratio relays so that the latter may be adjusted automatically in response to calculated changes in raw material relative flow rates. Suitable signals are provided from the weigh-feeders and level transmitters, which signals are used in the calculations carried out by the digital computer, with the ratio relays being adjusted by means of stepping motors under direct digital control from the computer.

In the proposed kiln heat balance control the computer is operative to calculate the amount of exothermic heat of reaction (i.e. the chemical heat), to indicate the effectiveness of process completion actually being obtained, as compared with that which could be expected in theory from a knowledge of the raw materials analysis.

The theoretical heat of reaction can be determined in the following manner using the predetermined formula relationships set forth.

*Theoretical net heat of reaction*

Let each pound of entering raw feed contain the following constituent materials relationship, as found from analysis:

$C_C$ lbs. $CaCo_3$ and this contains $C_A$ lbs. $CaO$
$C_M$ lbs. $MgCO_3$
$C_S$ lbs. $SiO_2$
$C_F$ lbs. $Fe_2O_3$
$C_K$ lbs. $KaoC_2(Al_2O_3)(SiO_2)_2 \cdot 2H_2O$
$C_W$ lbs. moisture These constituents are more generally described in Chapter 7 of the textbook "The Chemistry of Portland Cement" by R. H. Bogue, Reinhold Publishing Corp. 1955.

Using the well known Dahl equations, as set forth by L. A. Dahl, Rock Products, 41–42, 1938–1939; PCA Bulletin No. 1, 1939, the computer may calculate from the above the number of lbs. of $C_3S$, $C_2S$, and $C_3A$ in the final clinker and their corresponding amounts of silica $C_4$, $C_5$, $C_6$. The following calculation may then be performed.

The theoretical heat of reaction per pound of raw feed equals:

$$q_4 = 1800 \left[ \frac{-42.5 \, C_C}{100.09} - \frac{28.1 \, C_M}{84.33} + 27.7 \, C_4 + 2q.2 \, C_5 + 20.5 \, C_6 + 22.1 \, C_F - \frac{21.45 \, C_K}{258.17} \right] \text{B.t.u.} \quad (1)$$

The actual exothermic heat of reaction $q_{10}$ can be determined from the following formula relationship:

$$q_{10} = (q_1 + q_7) - (q_8 + q_6 + q_9) \quad (2)$$

where $q_1$ is the heat obtained from the gas fuel, $q_7$ is the heat realized from the secondary air flow, $q_8$ is the heat lost in the clinker, $q_6$ is the heat loss of the exhaust gases and $q_9$ is the heat loss through the kiln. The realizable difference to be gained through the present control invention is the quantity $q_4$, the theoretical heat of reaction, minus the quantity $q_{10}$, the actual heat of reaction.

ACTUAL HEAT INPUTS

(a) Fuel

Assuming natural gas as the fuel, the presence of a continuous on-stream calorimeter, and a pressure and temperature corrected gas flow meter being available, then the $$\text{Heat in fuel} = q_1 = F_q \cdot H \quad (3)$$

Where $F_q$ = gas flow in s.c.f.h. and $H$ = the known calorific value of gas B.t.u./s.c.f.

(b) Heat in secondary air

Assume that all the air passing through the secondary air fan enters the kiln, that the flow $F_A$ is measured, and that the air temperatures above and below the clinker at the cooler are $T_A$ and $T_B$ respectively. Then $$\text{Heat in secondary air} = q_7 = F_A \cdot C_{PA}(T_A - T_B) \quad (4)$$

The specific heat per cubic foot of air is $C_{PA}$ and is well known to persons skilled in this art.

ACTUAL HEAT LOSSES

(a) Heat in clinker

Knowing the secondary air flow rate $F_A$ the clinker output $F_C$ and air temperature rise, the clinker temperature $T_C$ may be calculated. $F_C$ can be calculated from known materials analysis and flow rates or it can be measured directly by a belt weigherd after cooling.

The heat lost in the clinker is then $$q_8 = F_C \cdot S_H (T_C - T_{AMB}) \quad (5)$$

Where $S_H$ is the specific heat of clinker and $(T_C - T_{AMB})$ is the temperature difference over ambient.

(b) Heat lost in gases

At the burner end of the kiln the amounts of input constituents are:

| | |
|---|---|
| $N_C$ mols carbon | |
| $N_H$ mols hydrogen | Data obtained from meters plus known gas analysis. |
| $N_N$ mols nitrogen in primary plus secondary air. | |
| $N_O$ mols oxygen in primary plus secondary air. | |
| $N_A$ mols nitrogen in leakage air | Unknowns to be calculated. |
| $N_B$ mols oxygen in leakage air | |
| At the feed end of the kiln there are: | |
| (I) $N_W$ mols water in feed stock | |
| (II) $N_D$ mols moisture from combustion of hydrogen in gases. | |
| (III) $N_E$ mols $CO_2$ from $CaCO_3$ and $MgCO_3$. | May be determined from measured quantities. |
| (IV) $N_F$ mols $CO_2$ from combustion of carbon in fuel. | |
| (V) $N_H$ mols nitrogen = $(N_N + N_A)$ | |
| (VI) $N_J$ mols oxygen = $(N_O + N_B)$ − (oxygen taken up in combustion of fuel). | Mass balance relationships. |

A gas sample taken from inside the feed end of the kiln before the ingress of leakage air and with suitable self-cleaning features may be used for the measurement of percent $CO_2$ and percent $O_2$ in the sample and the remaining quantity is percent $N_2$. Since $N_A$ and $N_B$ are the only unknowns in equations V and VI above, and $$\frac{N_A}{N_B} = \frac{79.01}{20.99}$$

then their values may be calculated.

The heat lost in the gases may now be calculated from statements I through VI, knowing gas temperature $T_q$:

$$q_6 = (T_q - 68)[CP_{H_2O}(T_q)(N_N + N_D) + CP_{CO_2}(T_q)(N_E + N_F) + CP_{N_2}(T_q)(N_N + N_A) + CP_{O_2}(T_q)(N_q)] \quad (6)$$

Where $CP_j(T_q)$ is the mean molar heat capacity between 68° F. and $T_q$ of the respective above gaseous components.

(c) Heat lost through kiln

Three special thermocouple devices, capable of measuring the difference in temperature between two fixed points within the brick, will be placed equidistantly around the periphery of the kiln and sets of these will be located at eight sections along the length of the kiln, as shown in FIG. 1, five sets in the burning zone and three in the drying and calcining zones. The EMF's from three such thermocouple devices will be picked off by means of slip rings and brush contacts as shown in FIGS. 5 and 6. This data may now be used to calculate the heat flux through the kiln, along the whole length of the kiln. The flux at any section = $q_0 = K\Delta_T$, where K is the transfer coefficient of the whole assembly.

$$\text{The total flux} = q_9 = \pi D \cdot \frac{5h_1}{288}[94q_{25} + 50q_{24} + 50q_{23} + 75q_{22} + 19q_{21}] + \pi D \cdot \frac{2h_2}{45}[75q_{21} + 32q_{20} + 12q_{19} + 39q_{18}] \quad (7)$$

where $h_1$ is the interval between thermocouple devices in the burning zone and $h_2$ is the interval between thermocouple devices in the drying zone.

The grinding mill optimization control can be such that for a given charge and speed there is an optimum mill total throughput and inlet unground slurry or pulp density which can be determined. The maintenance of these conditions requires a knowledge of the recycle load rate; two methods are available, both of which utilize the digital computer's capabilities. In method one using inlet density control as shown in copending patent application Ser. No. 601,618, filed Dec. 14, 1966 by R. E. Putnam, a pulp density transmitter is installed and used to regulate the rate of water addition; knowing the water flow and the total raw materials feed rate, and measuring the density of the cyclone underflow, the total amount of solids can now be computed and the inlet raw material feed rate and water flow rates controlled accordingly. By method number two using screen material balance, a measurement of the flow and density of the slurry entering the cyclone and leaving with the overflow is made and a computation of the water and solids in the material returned to the mill is determined. This information is now used to set both total solids flow and water addition rate to hold the grinding mill at its optimum operating condition.

For particle size determination, as shown in copending patent application Ser. No. 601,608, filed Dec. 14, 1966 by R. E. Putnam the measure of particle size distribution is desirable in order to ensure that the feed material behaves in a consistent manner as it proceeds through the kiln and to ensure that the different oxides are distributed evenly throughout the mix. The desired particle size distribution on-stream can be obtained using a calibrated cyclone classifier. A sample of the slurry at controlled density is fed to the cyclone at a discrete velocity and by measuring the flow and density of the feed and overflow the percentage of feed solids which report to the overflow is calculated. Since the limiting particle size in the overflow is a function of the inlet velocity, the computer can print a table showing inlet velocity, limiting particle size and the cumulative percentage of solids by weight which report to the overflow. The addition of an on-stream slurry X-ray analyzer enables this split to be apportioned amongst the oxides present. The whole program of flow control and measurement together with print out is performed by the computer in accordance with the pre-arranged program.

A consistent raw materials blend will improve the operation of the kiln, will improve the quality of the clinker and tolerances on clinker analysis will make best use of available raw materials and will reduce wear on the kiln lining and consequently increase production by reduced kiln shutdown time. Improvements in the operation of the grinding mill will allow the power per ton of product to be at a minimum under varying operating conditions and by closer particle size control will ensure that the reactions are fully completed in the kiln and that a minimum of unreacted material leaves with the clinker.

In FIG. 1 there is shown a rotary kiln 10 including a motor 12 operative to rotate the kiln 10 through a drive gear 14 and a ring gear 16 fastened to the kiln. A plurality of collector rings 18, 19, 20, 21, 22, 23, 24 and 25 are provided for indicating heat-flow measurements from the interior of the kiln through the kiln wall to the outside atmosphere at the respective locations of the provided collector rings; these temperature signals received from the latter collector rings are applied sequentially through a signal multiplex unit 28 and an analog to digital converter 30 to the control computer 32. The signal multiplex unit 28 is sequence controlled in its operation by control signals from the control computer 32.

Raw material to be processed through the rotary kiln 10 is supplied by a new material source 34 and passes through a grinder 36 in conjunction with a particle size classifier 38 and then passes through a material analyzer 40 before it is fed to the input of the kiln 10. The supply of new material by the new material source 34 is determined by a control signal from the control computer 32, as is the operation of the particle size classifier 38 determined by a control signal from the control computer 32. The material analyzer 40 can comprise an X-ray analyzer operative in sequence with individual component materials in the feed provided to the rotary kiln 10, with the sequential operation of the material analyzer 40 being determined by control signals from the control computer 32 and with the sequential analysis signals for the respective materials involved from the material analyzer 40 being supplied to the control computer 32.

Input fuel is supplied to the kiln 10, which fuel can be natural gas, from a fuel source 42. This fuel passes through a flow meter 44 which provides a signal $F_q$ to the control computer 32. The flow of fuel to a burner 46 is controlled by a valve 48 as determined by a provided temperature controller 50 which receives a set point signal from the control computer 32. The clinker temperature is monitored by a temperature pyrometer 52 and provides a corresponding control signal to the temperature controller 50 and to the control computer 32.

The clinker leaving the kiln 10 passes onto a cooler belt 54 driven by a motor 56, the speed of which is controlled from a transducer sensing the depth of the clinker bed on the cooler belt. The controller arrangement for this purpose is not shown since it is well known to persons skilled in this particular art.

Primary air is supplied to the burner 46 from a primary air source 58, which may include a fan, and passes through a flow meter 60 which provides a flow control signal to the control computer 32 as determined by the operation of a valve 62 controlled by the temperature controller 50.

A secondary air fan 64 provides secondary air through a flow meter 66 which in turn provides a control signal $F_A$ to the control computer 32, which secondary air then passes through the cooler belt; a first temperature sensing device 68 senses the temperature $T_B$ of the secondary air before it passes through the clinker bed on the cooler belt and a second temperature sensing device 70 senses the temperature $T_A$ of the secondary air after it passes through the clinker bed on the cooler belt. These respective temperature sensing devices 68 and 70 provide respective control signals $T_B$ and $T_A$ to the control computer 32.

A gas analyzer 74 is provided to analyze the exhaust gas leaving the kiln 10 in terms of its oxygen content and its carbon dioxide content to provide an indication of the input leakage air entering the rotary kiln before the exhaust gases leave the kiln. An exhaust fan 76 removes the exhaust gases and vapor and some dust that have passed through the rotary kiln and resulting from the operation of the burner 46. A residual air fan 78 provides air for cooling the clinkers, which residual air can be combined with the primary air as is the secondary air passing through the flow meter 66 to enhance the operation of the burner 46 as well known to persons skilled in this particular art. The radiation pyrometer 52 is focused on the clinker bed leaving the rotary kiln to provide a temperature indication of same. The temperature of the clinker can be varied by controlling the speed of the rotary kiln and by adjusting the set point of the temperature controller 50 to thereby vary the operation of the burner 46.

The five temperature sensing thermocouple devices operative with the connectors 21 through 25 provide control signals to inform the control computer 32 where the burning zone is located, with the operative speed of the kiln 10 being effective to vary the location of this burning zone as may be desired.

In FIG. 2 there is shown a differential thermocouple heat flow measuring device mounted within the kiln wall 80 and including a first cylindrical member 82 made of refractory material and inserted into a corresponding opening 84 in the wall 80 in a suitable manner. A first temperature sensing thermocouple 86, in the form of an expandable split ring, and a second temperature sensing thermocouple 88, in the form of a planar junction fastened to a steel plate, are positioned as shown in FIG. 2 with the member 82 being made of a refractory or ceramic material having a heat transfer coefficient characteristic substantially similar to the wall 80. A resilient spring 81 applies an inward directed force to a tapered spreading member 83 that moves between slidable arms 85 and 87 to spread outward and thereby increase the diameter of the split ring thermocouple 86 for the purpose of assuring a better temperature sensing by this thermocouple of the refractory wall 80 at a location adjacent to this thermocouple. A second spring 89 applies an inward force to the whole heat flow measuring structure to assure that the structure remains in its illustrated position within the wall opening with the thermocouple 88 in contact with the refractory wall material adjacent the position of this thermocouple. In this manner, with the distance $D_2$ being known and in the order of four inches and the distance $D_1$ being known and in the order of two and one-half inches there is provided a means to measure and determine the heat flow in B.t.u.'s per hour per square foot per inch per degree of temperature difference through the wall 80 of the rotary kiln.

In FIG. 3 there is shown the temperature relationship as a function of wall distance for the heat flow measuring device shown in FIG. 2, with the temperature at the exterior of the kiln being shown for distance $D_0$, the relative temperature at the distance $D_1$ and the projected relative temperature at the distance $D_2$ being indicated.

In FIG. 4 there is shown how each differential thermocouple location is arranged in circuit configuration. The innermost thermocouples 88', 88" and 88'" for each of the three radially spaced positions around the kiln at a given differential thermocouple location lengthwise of the kiln are connected in parallel and between two slip ring connections 100 and 102. The outermost thermocouples 86', 86" and 86'", corresponding to the thermocouple 86 shown in FIG. 2, are similarly parallel connected between slip ring connectors 102 and 104.

In FIG. 5 the radial positions of the respective three thermocouple heat flow sensing devices are shown with one of the slip ring connectors 104 provided and a brush contact member 108 being operative to obtain a signal therefrom.

In FIG. 6 the two thermocouples 86 and 88 of a given heat flow sensing device, as shown in FIG. 2, are shown connected between the slip ring members 100, 102 and 104, with temperature signals being taken therefrom by the signal multiplex unit 28.

As shown in FIG. 7, the material analyzer 40 provides individual component material analysis signals through the connection 41 to the control computer 32 to control the programmed input flow rates of the infeed materials such as sand, iron ore, shale and limestone from the respective feeder devices 43, 45, 47 and 49 which are then controlled through control of the conveyor device 51 in terms of total flow rate of all materials supplied by the new materials source to the material grinder 36. A desired particle size output from the grinder 36 is obtained through operation of the particle size classifier 38 as set forth in greater detail in copending application Ser. No. 601,608, filed Dec. 14, 1966, by Mr. R. E. Putnam and assigned to the same assignee as is the present application. In this way a desired particle size of the desired mixture of infeed material is supplied to the rotary kiln 10. It should be understood that the general operation of a rotary kiln and the new materials supply for a cement plant process per se are well known to persons skilled in this particular art.

One particular suitable strategy for controlling the relative flow rates of each raw material to achieve a desired oxide blend is the following, where the four raw materials are respectively limestone, sand, shale and iron ore, with each raw material contributing the bulk of respectively lime, silica, alumina and iron oxide. A typical analysis of these latter materials as available from the four raw materials is given below.

|   | Limestone (w) | Sand (x) | Shale (y) | Iron ore (z) |
| --- | --- | --- | --- | --- |
| CaO | 53 | 0 | 1 | 0 |
| SiO$_2$ | 5 | 98 | 65 | 65 |
| Al$_2$O$_3$ | 0 | 0 | 24 | 0 |
| Fe$_2$O$_3$ | 1 | 2 | 8 | 35 |

The percentages of oxides in the different raw materials, together with the desired percentages of oxides in the finished blend, may now form the constants in a set of four simultaneous equations as follows:

$$C_wW + C_xX + C_yY + C_zZ = C_T \quad (8)$$
$$S_wW + S_xX + S_yY + S_zZ = S_T \quad (9)$$
$$A_wW + A_xX + A_yY + A_zZ = A_T \quad (10)$$
$$F_wW + F_xX + F_yY + F_zZ = F_T \quad (11)$$

where C, S, A, F are respectively the percentages of lime, silica, alumina and iron oxide in the raw materials and in the blend (T), while W, X, Y and Z are respectively the flow rates of limestone, sand, clay and iron ore. It is clear that there is a unique solution to this set of equations which gives the values of the flow rates of the different raw materials to achieve a desired blend. This technique is applicable where each raw material delivers the bulk of one oxide, since the solutions will all be positive in sign.

In order to achieve the desired infeed of raw materials the control computer 32 is tied into the well known ratio relays of the respective material feeders to adjust the latter automatically in response to calculated percentages in raw material relative flow rates. The signals from the input materials weigh-feeders and a provided storage tank level transmitter are combined in the calculations made by the control computer 32 such that the ratio relays are adjusted by means of stepping motors under direct digital control from the control computer 32.

The theoretical heat of reaction $q_4$ is now calculated by the control computer 32 utilizing above Equation 1 for this purpose. This is the desired quantity heat of reaction to be obtained by the optimum control of process completion in accordance with the present invention.

The control computer 32 operates to calculate the actual heat inputs to the rotary kiln 10 from each of the heat sources. The fuel, assuming natural gas as the fuel, and the presence of a continuous on-stream calorimeter the heat obtained from the fuel $q_1$ is determined as the product of the gas flow $F_q$ times the caloric value of the gas H, where $F_q$ is the gas flow in cubic feet per hour and the caloric value is a gas B.t.u. per cubic foot; see above Equation 3. The secondary air supplies heat $q_7$ in terms of the flow $F_A$ measured by the flow meter 66 times the specific heat $C_{PA}$ times the temperature rise $(T_A - T_B)$ across the grate; see above Equation 4. The heat losses from the rotary kiln are through the heat removed by the clinker $q_8$ in terms of the secondary air flow $F_A$ the clinker output $F_C$ and the air temperature rise and the clinker temperature $T_C$ sensed by the radiation pyrometer 52; see above Equation 5. The heat loss in the gases at the burner end of the kiln and at the feed end of the kiln are calculated as previously set forth; see above Equation 6. The heat loss through the kiln wall is determined by means of the heat flow sensing thermocouple devices with the heat flux at any given section $q_0$ equals K, the heat transfer coefficient of the whole assembly, times $\Delta T$, the temperature difference sensed by the heat flow sensing device. The total heat flux $q_9$ lost through the kiln is obtained by the previously given above Formula 7.

The actual exothermic heat of reaction is calculated by subtracting the heat losses from the actual heat inputs. The difference between the theoretical net heat of reaction $q_4$ and the actual exothermic heat of reaction $q_{10}$ gives an error signal $\Delta q$ to be corrected through the illustrated closed loop control operation of the control computer 32. This error signal $\Delta q$ is applied primarily as a set point for the temperature controller 50 for adjusting as desired the clinker temperature. Secondarily, the speed of the kiln 10 can be controlled by this error signal $\Delta q$, but it is desired to maintain the position of the maximum heat flux $q_{max}$ at a predetermined location along the length of the kiln 10 and within the burning zone, for example, it might be desired to hold the position of $q_{max}$ adjacent the thermocouple device 24.

It is the general practice of the present invention to provide a desired control of the involved process in relation to proper clinker chemistry with a minimum of heat input to the kiln. The actual exothermic heat within the kiln is the process parameter chosen to control the process. In terms of process operation efficiency, the total amount of input heat supplied to the kiln in relation to the output clinker produced is monitored; however, it must be realized that the maximum theoretical exothermic heat of reaction may be obtained with an adequate heat input as well as with an excess of heat input to the process operation taking place within the kiln. By measuring the actual exothermic heat of reaction taking place and adjusting the burner operation to maintain a heat input to yield not more than the desired theoretical heat of reaction, a realistic control of the kiln heat balance as desired is effected. The present control determines how much heat input is supplied to the solids in the kiln, and using the desired empirical ratio of heat input versus kiln feed flow rate, which is determined from known prior operation of the particular kiln to be controlled, as a constraint upon the set point supplied to the temperature controller, it is practical to avoid using more heat input than necessary but still maintain the desired actual heat of reaction within the kiln; the speed of the kiln can also be adjusted to avoid excess heat into the process. Additionally, the location of the maximum heat flow through the kiln wall in the burning zone of the kiln is sensed by the computer and utilized as a constraint on the kiln speed control to maintain the desired position of this maximum heat flow location within the burning zone.

As a practical control operation of the kiln, the kiln speed is initially programmed in conjunction with the programming of the input materials feed rate to provide a desired profile of solids within the kiln; the flow of input materials to the kiln is sensed by a suitable flow metering device and the speed of the kiln is sensed by a tachometer coupled to the kiln drive motor. Then the computer determines the difference or error between the desired theoretical heat of reaction within the kiln and the obtained actual heat of reaction taking place within the kiln to provide a temperature control signal to the temperature controller operative with the kiln burner for reducing to substantially zero or a minimum practical value this difference or error; in this regard it is important that no excess heat input is supplied more than required to reduce to a minimum practical value this temperature difference or error. This temperature control is the primary control provided. If the burning zone within the kiln should shift out of its desired range within the kiln as a result of a change in heat input, the kiln speed can be varied to correct this shift of the burning zone; for example, a decrease of the kiln speed will move the burning zone back into the kiln as desired and an increase of the kiln speed will move the burning zone out of the kiln as desired to correct a burning zone shift due to additional heat input causing the burning zone to move into the kiln and a decrease in heat input causing the burning zone to move out of the kiln. This speed control is the secondary control provided. As a constraint for the speed control operation, the location of the maximum heat flow $q_{max}$ through the kiln wall is monitored by the computer in conjunction with the thermocouple devices provided in the kiln burning zone, and the kiln speed is varied as necessary to maintain the desired location of the maximum heat flow.

It should be understood that the herein described control arrangement is illustrative of the principles of the present invention, and other embodiments can be made within the scope and spirit of this invention.

We claim as our invention:

1. In control apparatus for a rotary kiln having at least one heat input source and a drive motor, the combination of
   first heat determining means for providing a first control signal in accordance with predetermined heat losses associated with the operation of said kiln,
   second heat determining means for providing a second control signal in accordance with predetermined heat inputs associated with the operation of said kiln,
   control means responsive to a predetermined relationship between said first and second control signals for controlling the operation of at least one of said heat input source and said drive motor to provide a desired operation of said kiln.

2. The control apparatus of claim 1 including first control means for determining the heat flow through the walls of said kiln,
   second control means for determining the heat energy losses in the exhaust gases leaving said kiln,
   third control means for determining the heat energy input to said kiln through operation of said burner,
   and kiln control means operative with at least said first, second and third means for determining the actual heat of reaction taking place within said kiln in accordance with at least said heat flow, said heat energy losses and said heat energy input,
   with said kiln control means being adapted to control at least one of the operation of said burner and the operation of said motor to provide a predetermined control of said kiln.

3. The control apparatus of claim 1, including
   materials analysis means responsive to the input component materials supplied to said kiln for providing component control signals to said control means in accordance with the respective component materials supplied to said kiln,
   with said control means being operative to provide a predetermined supply of the respective component materials to said kiln in regard to the desired operation of said kiln.

4. The control apparatus of claim 3, with said control means determining the theoretical heat of reaction within said kiln in accordance with the supply of materials to said kiln,
   said control means being operative to control the operation of said kiln in accordance with said theoretical heat of reaction.

5. In heat control apparatus for a rotary kiln having a burner and a drive motor, the combination of
   first heat loss determining means for providing a first control quantity in accordance with the heat energy loss through the walls of said kiln, second heat loss determining means for providing a second control quantity in accordance with the heat energy loss of the exhaust gases leaving said kiln,
   third heat loss determining means for providing a third control quantity in accordance with the heat energy loss in the clinker leaving the kiln,
   first heat input determining means for providing a fourth control quantity in accordance with the heat input to said kiln obtained from the gas fuel supplied to said burner,
   second heat input determining means for providing a fifth control quantity in accordance with the heat input to said kiln obtained from at least the secondary air flow to said kiln,
   and control means for determining the actual heat of reaction taking place within said kiln as a predetermined relationship between said first, second and third control quantities and said fourth and fifth control quantities,
   with said control means being operative to control the operation of at least one of said burner and said drive motor in accordance with said actual heat of reaction.

6. The heat control apparatus of claim 5,
   with said control means including a computer for effecting a predetermined difference between the sum of said first, second and third control quantities and the sum of said fourth and fifth control quantities for controlling the operation of at least one of said burner and said drive motor.

7. The method of operating a rotary kiln, including
   determining the theoretical heat of reaction that can take place within said kiln in relation to the supply of input materials to said kiln,
   determining the actual heat of reaction taking place within said kiln in relation to the heat losses from said kiln and the heat inputs to said kiln that are present during the operation of said kiln,
   and controlling at least said heat inputs to said kiln to maintain a predetermined relationship between said theoretical heat of reaction and said actual heat of reaction during the operation of said kiln.

8. The method of claim 7, including
   controlling the speed of said kiln to maintain the burning zone of the kiln within a desired range of position and to secondarily maintain said predetermined relationship between said theoretical heat of reaction and said actual heat of reaction during the operation of said kiln.

References Cited

UNITED STATES PATENTS

| | | | |
|---|---|---|---|
| 3,300,196 | 1/1967 | Bendy | 263—32 |
| 3,366,374 | 1/1968 | Bay et al. | 263—32 |

OTHER REFERENCES

Sandelien, J. F.: Pages 35 and 36 of IBM Technical Disclosure Bulletin, vol. 6, No. 5, October 1963.

JOHN J. CAMBY, *Primary Examiner.*